United States Patent [19]
Reitboeck et al.

[11] 3,849,633
[45] Nov. 19, 1974

[54] OBJECT IDENTIFYING APPARATUS

[75] Inventors: Herbert J. P. Reitboeck; Thomas P. Brody, both of Pittsburgh, Pa.

[73] Assignee: Westinghouse Electric Corporation, Pittsburgh, Pa.

[22] Filed: July 17, 1973

[21] Appl. No.: 380,182

Related U.S. Application Data
[62] Division of Ser. No. 215,333, Jan. 4, 1972.

[52] U.S. Cl............ 235/61.12 N, 235/61.11 H, 340/146.3 K, 343/6.5 SS
[51] Int. Cl...... G06k 19/03, G06k 7/01, G01s 9/56
[58] Field of Search.. 235/61.12 R, 61.12 N, 61.12 M 235/61.12 C, 61.12 LC, 61.11 D, 61.11 H, 61.7 B, 61.6; 340/146.3 K; 343/6.5 R, 6.5 SS

[56] References Cited
UNITED STATES PATENTS
| | | | |
|---|---|---|---|
| 3,185,964 | 5/1965 | Margiloff | 235/61.12 C |
| 3,299,424 | 1/1967 | Vinding | 343/6.5 SS |
| 3,702,464 | 11/1972 | Castrucci | 235/61.12 N |
| 3,755,803 | 3/1970 | Cole et al. | 340/280 |

FOREIGN PATENTS OR APPLICATIONS
| | | | |
|---|---|---|---|
| 1,206,925 | 9/1970 | Great Britain | 343/6.5 SS |

*Primary Examiner*—Daryl W. Cook
*Attorney, Agent, or Firm*—D. Schron

[57] ABSTRACT

An object-identifying label having printed on a throw-away flexible substrate an identifying electrical circuit and moved with the object through a region where the identifying circuit is read. Typically, the object is a mail sack or baggage which is to be directed along a predetermined path. When the object moves through the region, the label is randomly positioned in the region. A substantially homogeneous electromagnetic field is produced in the region and as the object moves through the region, the circuit on the label is powered only by, and reacts with, the field, absorbing energy from the field.

9 Claims, 12 Drawing Figures

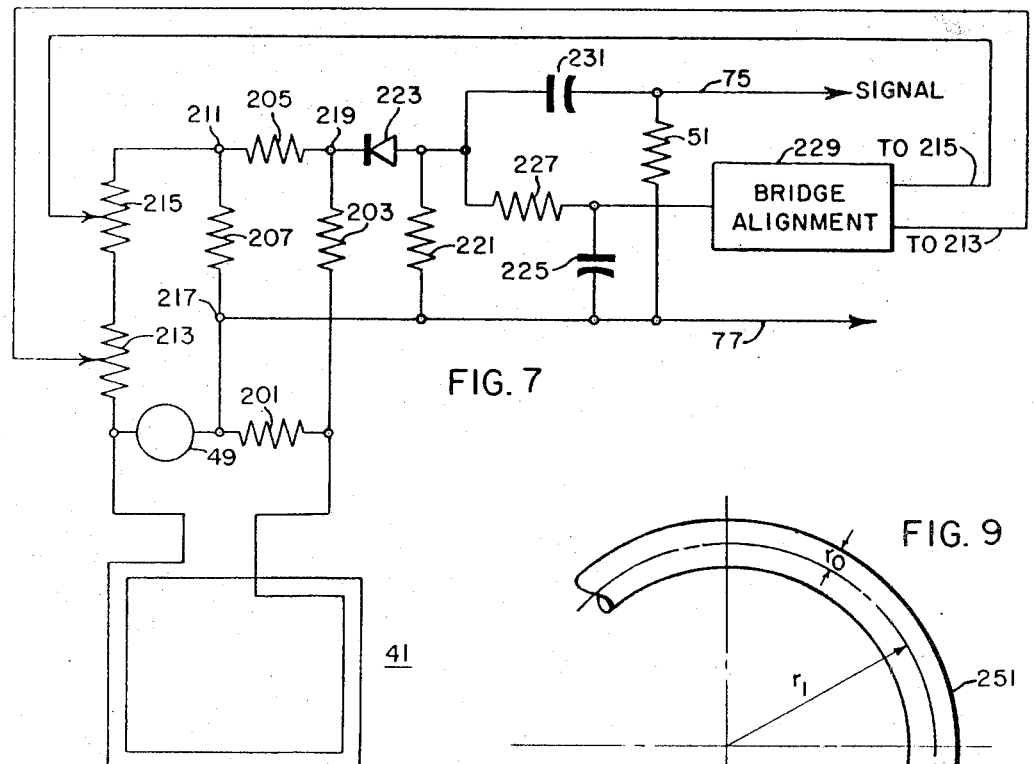
FIG. 7
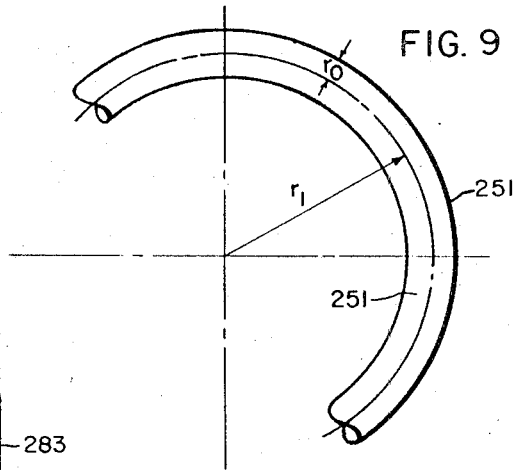
FIG. 9
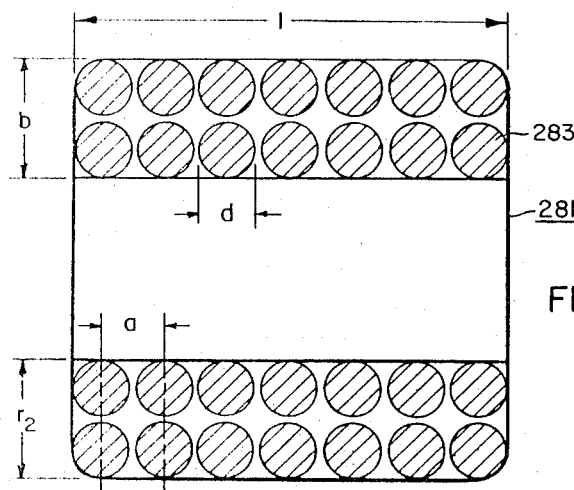
FIG. 10
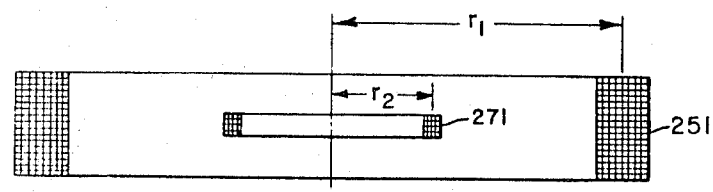

OBJECT IDENTIFYING APPARATUS

This is a division, of application Ser. No. 215,333 filed Jan. 4, 1972.

CROSS-REFERENCE TO RELATED DOCUMENTS

The following documents are incorporated in this application by reference as of special significance to this invention unlike the significance of the prior art as a whole.

Reference I — *Flexible Thin-Film Transistors Stretch Performance, Shrink Cost* — Peter Brody and Derrick Page — Electronics — Aug. 19, 1968.

Reference II — *Flexible Transistors, Large-Scale Integration And Displays* — T. P. Brody and D. J. Page — Digest of Technical Papers — 1969 Government Microcircuits Applications Conference, Washington, D.C. September, 1969. Reference III — *Digital Integrated Circuit D.A.T.A. Book* — 12th Edition.

BACKGROUND OF THE INVENTION

This invention relates to automatic object identification and automatic object classification and sorting and has particular relationship to such identification and sorting where the identifying intelligence is randomly positioned. In the interest of concreteness, this invention is described in this application as used in the sorting of such objects as mail sacks in an automatic Post-Office facility or of baggage in an airport. Such objects are moved usually by a conveyor in being sorted. However, this invention may also be applied to identification and classification of objects moving under their own power, for example, vehicles or persons passing into a military compound or other secure area. It is an object of this invention to achieve high reliability in such an automatic identification, classification and sorting.

As typical of the prior art in the area of this invention are the U.S. Vinding Pats. No. 3,299,424 and Cambornac U.S. Pat. No. 3,438,489. These references disclose apparatus in which the object to be identified carries identifying intelligence on a label or the like. There is also disclosed an interrogator which interrogates the label and produces a visual or audial signal identifying the object. Such objects as mail sacks pass through the region of identification with their labels in random positions and the identifying labels must overcome this handicap. Vinding's and Cambornac's labels do not lend themselves to effective reliable identification. Vinding's relaxation oscillator (FIG. 5) requires the same coupling for each label to the interrogator and Cambornac's label includes a transmitter complex in its operation.

It is an object of this invention to overcome the disadvantages of the prior art and to provide, for the identification or sorting of objects which carry an identifying label that assumes a random position durng the sorting, a label that shall effectuate highly reliable identification, classification and sorting.

SUMMARY OF THE INVENTION

This invention arises from the realization that reliability of the prior-art apparatus as typified by Cambornac is wanting because in such apparatus the identifying intelligence is actively transmitted back from the label in the mailbag to the sorting receiver. The magnitude of the received signal then depends on the signal transmitted from the label and may be larger or smaller or lost in the noise of the sorting detector depending on the position of the label with respect to the transmitting and receiving antennas of the sorting apparatus.

In accordance with this invention, the identifying intelligence which is embodied in a circuit on the label produces energy absorption from an electromagnetic field through which the object with the label attached to it passes. The energy absorption is converted into impulses in groups or trains, each group or set of groups constituting an identifying code which serves to produce an identifying or classifying signal.

More concretely, the label carries a solid-state circuit on a flexible substrate, as disclosed in References I and II above, which may be called an "electronic post stamp." Typically, the circuit includes an antenna or coil for deriving energy from the field and counter means energized from the antenna or coil. The counter means is typically a plurality of interrupted ring counters or shift registers which are pre-set to produce the groups of energy-absorbing pulses constituting the identifying code for each object. Such counter means is shown in Reference III, for example, EO3-18 shown on page 238. However, typically the counter means may be made up of sets of monostable multivibrators preferably formed of field effect transistors, each set being connected to flop from OFF to ON in sequence and the sets being interrelated to produce an adequate number of digits for the code (for example, five digits for a ZIP code). As the conduction of the transistors forming the multivibrators changes in sequence, the energy absorption from the field changes. The changes are abrupt, particularly if field-effect transistors are used, and can be differentiated electrically to produce sharp pulses. The field through which the object passes is substantially homogeneous; that is, of sufficient magnitude throughout the identifying region to reflect accurately and reliably identifiable the changes in the absorption of energy from the labels.

The identification achieved with this label is highly reliable because the code is composed of the sequential order of ON-OFF pulses and does not depend on the magnitude of these pulses. The apparatus lends itself readily to use of the "electronic post stamp" on the label since it operates in a simple manner with induced or received power.

BRIEF DESCRIPTION OF THE DRAWING

For a better understanding of this invention, both as to its organization and as to its method of operation, together with additional objects and advantages thereof, reference is made to the following description, taken in connection with the accompanying drawings, in which:

FIG. 7 is a schematic of a circuit for reliable detecting and differentiating the energy absorption by a label in the practice of this invention; and FIGS. 8, 9 and 10 are diagrams used in computations of the electrical parameters which are involved in the practice of this invention.

DETAILED DESCRIPTION OF EMBODIMENTS

Figures 1, 3:
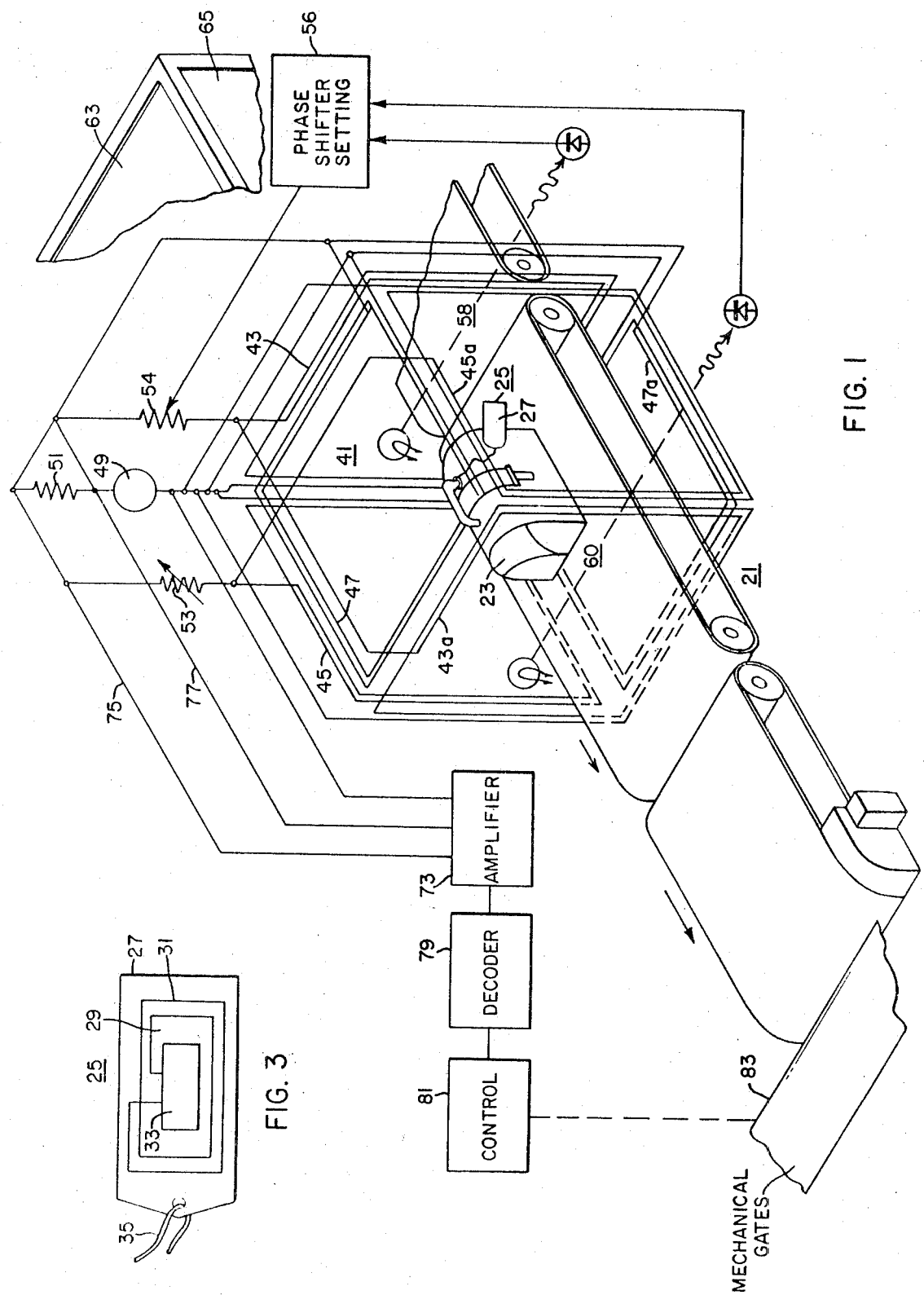
FIG. 1 is a view partly in perspective with parts broken away and partly diagrammatic showing an object-identifying apparatus which supplies the energy absorbed by the labels according to this invention and responds to the absorption of energy by those labels.
FIG. 3 is a plan view of the object-identifying label in accordance with this invention.

The apparatus shown in the drawings includes a conveyor system 21 along which objects 23 to be classified or sorted are advanced. Each object 23 carries a label 25. The label 25 (FIG. 3) typically comprises a rectangular plate 27 of cardboard or the like to which is secured a flexible substrate 29 having impressed thereon an object-identifying circuit. This circuit includes a coil or antenna 31 to which is connected a network 33. When electrical energy is induced by an electromagnetic field in the antenna, the circuit absorbs energy from the field. The network 33 is structured so that the absorbed energy varies in such a way as to produce an object-identifying code. The plate 27 has wire or strings 35, or may be provided with a pressure-sensitive adhesive on its back face (not shown) for attachment to the object 23.

The conveyor 21 carries the object 23 through a substantially homogeneous electromagnetic field. This field is produced by an assembly 41 of three pairs 43, 43a, 45, 45a, 47, 47a of Helmholtz coils mutually at right angles to each other. The pairs of coils are energized from a radio-frequency source 49 which may typically have a frequency of the order of 1 Mega-Hertz through a resistor 51 (or other type of impedance) across which is produced a voltage drop corresponding to the time-differential of the energy absorption reflected by the antenna 31 (see FIG. 7). The connection to two of three pairs of coils includes variable impedances 53 and 54 for setting the phase of the current flowing through the two pairs of coils. The assembly 41 produces a substantially homogeneous electromagnetic field; the coupling between the field and the antenna 31 may be improved in reliability by automatic setting of the impedance 54 to two opposite values by phase-shift setter 56 while the object 23 is moving through the field. The setter 56 may be shifted between the two settings responsive to switches 58 and 60 (photo-electric typically) which set the phase shift in one position when the object 23 enters the field and in a second opposite position after it passes part way through the field. Thus, any difficulty with obtaining a reliable signal by reason of parallelism between the antenna 31 and the field is avoided.

Figure 2:
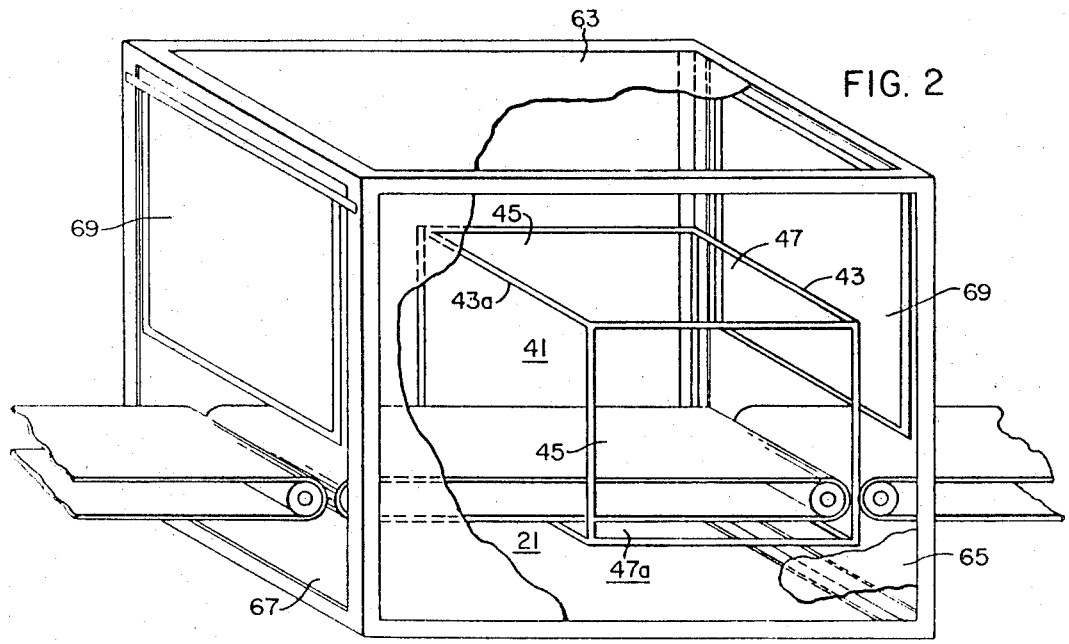
FIG. 2 is a view in perspective showing particularly the electromagnetic field producing coils and the shield for the field of the apparatus shown in FIG. 1.

The assembly 41 is enclosed in a magnetically shielded box 61. This box is generally in the form of a rectangular parallelepiped whose faces typically consist of a foil of plastic that contains magnetic particles in an insulating suspension. As an additional protection against the influence of external electric fields, a second shield such as copper wire mesh, or laminar metal foils (not shown) can be added on the outside. At the opposite faces 65 and 67 through which the object 23 is carried by the conveyor in and out of the box 61, the box is provided either with hinged flaps 69 or photo cell controlled doors, made of the abovementioned shielding material (FIG. 2).

The resistor 51 is connected to derive signal current pulses from a bridge network 71 shown in FIG. 7. The voltage pulses which appear across resistor 51 are impressed on the input of an amplifier 73 through conductors 75 and 77. The output of the amplifier impresses pulses on a decoder 79 which supplies the signals resulting from the decoding to a control 81 (a logic network) that actuates mechanical gates 83 to sort the objects 23 in accordance with the codes.

Figure 4:
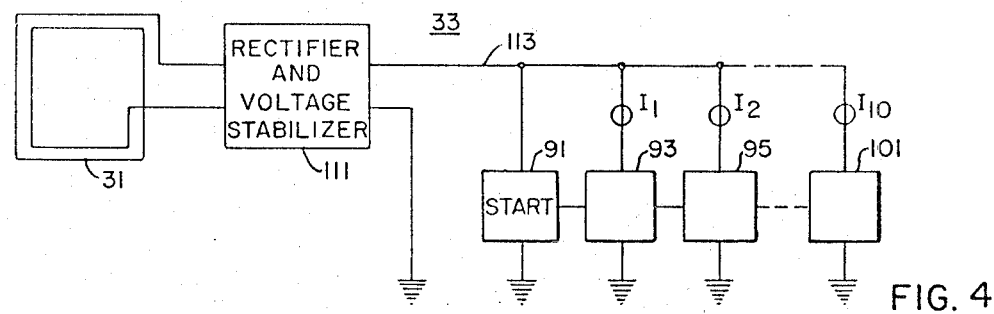
FIG. 4 is a schematic of counting means of relatively simple structure which is impresssed on a flexible substrate of a label in accordance with this invention.

A circuit imprinted on a substrate 29 on a label 25 in accordance with this invention with which a simple number code can be produced is shown in FIG. 4. This circuit includes a start network or electronic gate 91 and a succession of counter elements 93, 95, 101. The network 33 is supplied with power from the antenna 31 through a rectifier and voltage stabilizer 111 which supplies potential between its hot terminal 113 and ground. The start network 91 is connected directly to terminal 113; the elements 93 through 101 are each connected to the terminal 113 through perforable "knock-out" I1, I2–I10, any of which may be perforated to interrupt the connection of the element to the terminal 113. The start network is connected to the start input of the first element 93; the element 93 and each element thereafter is connected to the start input of a succeeding element 95 through 101. When an element 93 through 101 receives power from terminal 113 and in addition receives a start signal, it is actuated or flops and a valve, for example, a field-effect transistor, is rendered conducting. Each element in its turn remains actuated for a predetermined interval and then becomes quiescent and transmits a starting signal to the next element. The number N of successive elements 93, 95–101 which are actuated is determined by interrupting the conduction through the $n + 1$st element by perforating its associated "knock-out" I$n + 1$. Thus, if "knock-out" I2 is perforated, only element 93 is actuated; if "knockout" I10 is perforated, nine elements are actuated.

In the use of the network 33 shown in FIG. 4, terminal 113 and the start network 91 are actuated when the label 23 with circuit 33 is moved into the electromagnetic field. Element 93 is then actuated. A predetermined time interval after 93 is actuated, it impresses a starting signal on element 95 and the latter is actuated; a predetermined time interval later, 95 impresses a signal on the next element actuating it, and so on until the element preceding the one whose connection to terminal 113 is interrupted is actuated. On each actuating, a current flows through the element absorbing energy from the field.

The code in this case is produced by differentiating the absorbed energy and consists of a number of impulses. Apparatus in which the label includes a circuit as shown in FIG. 4 could serve to direct objects 23 along separate paths corresponding to the number of absorbed impulses. In this case, the control 81 responds to the number of impulses to set the gates 83 accordingly.

Figure 5:
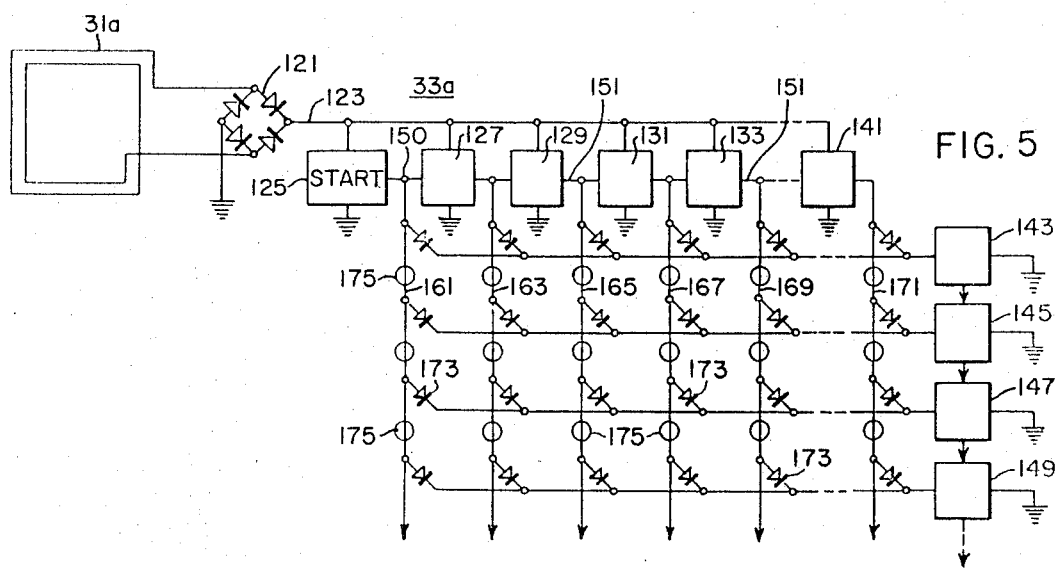
FIG. 5 is a like schematic of counting means for producing a coded absorption impulse train having a plurality of digits.

FIG. 5 shows a coding circuit 33a which is capable of producing a more complex code, for example, a ZIP code. The antenna 31a is connected to the coding network through a rectifier 121 having hot output terminal 123. The terminal 123 supplies a start network 125 which in turn is connected to turn on in sequence a succession of counting elements 127, 129, 131, 133 and 141 and another sequence of counting elements 143, 145, 147, 149 —. For producing a ZIP code, there may be four elements 127–141 and 10 elements 143–149.

The elements 127–141 are free running and once actuated by the start network 125 through terminal 150, operate in the same sequence or cycle on each start. The timing components of these elements is such that they shift from each to the succeeding element at a relatively low rate, for example, one millisecond. When each element 127–141 times out, it sends a starting signal to the succeeding element through terminals 151. For any element 127–141 to be actuated, it is necessary that it receive a start signal through terminal 150 or 151 and voltage through terminal 123.

The counting elements 143–149 are connected respectively to terminals 150 and 151 through conductors 161, 163, 165, 167, 169, 171 and through diodes 173. The conductors 161–171 include "knock-outs" or interrupting positions 175 where the conductors 161 may be interrupted to set the numbers of elements 143 through 149 connected to each terminal 150 or 151. For example, if the upper "knock-out" 175 in conductor 161 is perforated, only element 143 is actuated through terminal 150; if the lower "knock-out" 175 in conductor 165 is perforated, only elements 143, 145, 147 are actuated through the terminal 150 through which conductor 165 is connected to element 129. The elements connected to any conductor 161–171 flop at a frequency which is substantially higher than the frequency at which the elements 127–141 flop. Typically, the elements 143–149 may flop in succession in .05 millisecond after they are actuated.

The interruption of the conductors 161–171 at positions 175 of FIG. 5 and at 11 through 110 of FIG. 4 can be carried out in a number of different ways; for example by key punching or by etching. For etching, a sheet of plastic or paper that contains on one side microscopic bubbles with sealed-in acid would be opposite to the printed circuitry. When pressure is applied (e.g., by writing on the sheet) the bubbles break and the released acid locally interrupts the circuitry.

Figure 6:
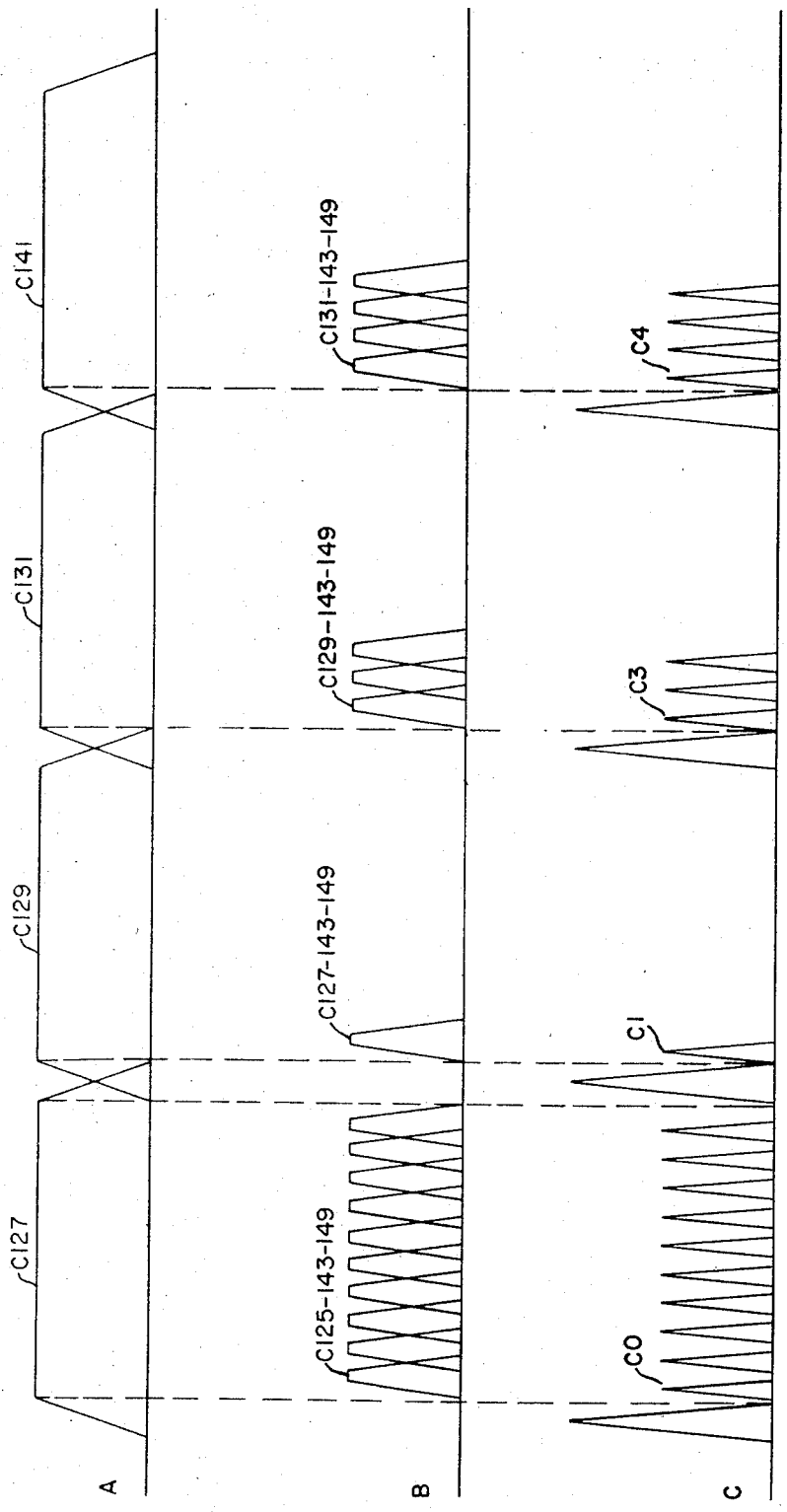
FIGS. 6A, B, C are graphs showing the operation of the counting means of FIG. 5 in the practice of this invention.

The operation of the circuit shown in FIG. 5 will be explained with reference to FIG. 6, particularly FIGS. 6A and 6B. In FIGS. 6A and 6B current is plotted vertically and time horizontally. Points along the time axis on all graphs 6A, 6B, 6C which are at the same distance from the ordinate axes represent the same time instant.

When the label carrying an appropriately set circuit as is shown in FIG. 5 moves into the field produced by assembly 41 (FIG. 1) power is impressed on terminal 123 and the start network 125 is actual and then the counter elements 127 to 141 are actuated in succession, each element conducting for an interval of the order of 1 millisecond and then rendering the succeeding one conducting while it is rendered non-conducting by the reaction of the succeeding element. The generally trapezoidal curves of FIG. 6A represent the conduction of each of the elements 127 to 141 in its turn and are labelled accordingly with a prefix C. The rising and falling ends of each of the curves C127 to C141 have a high slope, particularly as the elements 127–141 are formed of field-effect transistors.

The actuation of the start network also causes the counter elements 143 through 149 to be actuated up to the element preceding the open "knock-out" point 175 in line 161. This actuation of elements 143 through 149 is represented by the narrow trapezoidal curves on the right of FIG. 6B which are identified as C125-143-149. This set of curves corresponds to a condition in which there are ten elements 143–149 and no "knock-out" 175 in line 161 is perforated. The first digit of the code is zero.

The actuation of element 127 causes elements 143 through 149 to be actuated up to the perforated "knock-out" in line 163 which is the first "knock-out." In this case, only element 143 is actuated. The curve is identified as C127-143-149 in FIG. 6B. This actuation produces the second digit 1. In the same manner, the third digit, 3, and the fourth digit, 4, are produced as shown in FIG. 6B. A fifth digit (not shown) is produced through element 141 and line 171.

FIG. 7 shows the detector circuit which responds to the absorption of energy by the circuits of FIGS. 4 or 5 and converts the variations in this absorption into an object-identifying code. The current pulses produced in these circuit are of the order of a few microamperes compared to field-producing current which may be as high as ten amperes. The circuit shown in FIG. 7 takes advantage of the fact that the current pulses caused by the power absorption have an approximate phase shift of 90°. To achieve this advantage, the detector circuit is phase sensitive.

The detector circuit includes the bridge network 71. The network 71 includes the power supply 49, a sensing resistor or impedance 201 and balancing impedances 203, 205, 207. The impedance 201 may be a standard resistor of one ohm, for example, and the other impedances may be appropriately dimensioned. The source 49 and the assembly 41 are connected across the sensing impedance 201. The source 49 is also connected to the junction 211 of the bridge through variable attenuation impedance 213 and phase-shifter 215. The output terminals of the bridge 71 are at the junctions 217 of the source 49 and the impedance 201 and the junction 219 of resistors 203 and 205. Between terminals 217 and 219 a voltage $U_s$ is derived which varies with the power absorbed by the object identifying circuit (FIGS. 4, 5).

The potential $U_s$ is impressed across an impedance 221 through a diode 223 which operates as a rectifier. The rectified voltage $U_s$ has a low frequency (slow) component, caused by the movement of the object 23 and label 25 and the varying absorption of the object 23 and it moves, and a high frequency (fast), pulsed component, produced by the circuit in the label. The slow component is impressed across a capacitor 225 through a resistor 227 which operate as an integrating network. The voltage of capacitor 225 supplies a bridge alignment network 229 which is connected to attenuator 213 and phase shifter 215 to maintain the bridge 71 in alignment. The pulsed component is passed through a differentiating network including capacitor 231 and resistor 51 and it delivers the code signals to amplifier 73 (FIG. 1).

The operation of the detector circuit is illustrated in FIG. 6C in which time-rate-of-change of the current represented in FIGS. 6A and 6B is plotted vertically and time horizontally. The sharply peaked curves identified by C0, C1, C3, C4 are the pulses transmitted to amplifier 73. These pulses depend on the rate at which the counter elements 127 to 149 pass from nonconducting state to fully conducting state and are positively and reliably identifiable.

COMPUTATION ON TYPICAL APPARATUS

The following computation of the voltage induction in the coil or antenna 31 of the circuit on the label is made with reference to the simplified structure shown in FIG. 8.

It is assumed that the assembly 41 and antenna 31 are coplanar and are represented by coils 251 and 271 having parameters as indicated. It should be noted, however, that in the actual design, a Helmholtz arrangement of the antennas should be used, since coplanarity of the antennas 41 and 31 is generally not fulfilled in practice.

The mutual inductivity between two coils (FIG. 1) is:

$$M^{[nH]} \doteq 2\pi^2 \, r_2/r_1^2 \, W_1 \, W_2 \tag{1}$$

where $W_1$ and $W_2$ are the respective numbers of turns in coils 251 and 271. The voltage induced in coil 2 (antenna 31) is given by $$U_2 = M \, di_1/dt \tag{2}$$

where $i_1$ is the instantaneous value of the current in the coil 251. With $i_1 = J_1 \cos(2\pi ft)$ we obtain for the peak value of the voltage in the coil 271:

$$U_2^{[V]} \doteq M \cdot 2\pi f \cdot J_1^{[A]} \doteq 4\pi^3 \cdot 10^{-9} \cdot r_2^2/r_1 \, W_1 \, W_2 \cdot f \cdot J_1^{[A]} \tag{3}$$

For $r_1 = 50$ cm, $r_2 = 2$ cm, $W_1 = 1$, $W_2 = 100$, we obtain from Eq. (3):

$$U_2^{[V]} \doteq 10^{-6} \cdot f \cdot J_1^{[A]} \tag{4}$$

Eq. (4) applies to unshielded coil 251 and a coil 271 without ferrite.

The power requirement for the field produced by assembly 41 will be computed with reference to FIG. 9. An antenna 251 (loop antenna) of one turn has been chosen above for the following reasons:

From Eq. (3) it follows that the voltage, $U_2$, which is induced in the antenna 31 on the label, is proportional to the number of windings $W_1$ of the antenna 251, at a given current, $J_1$, for coil 251.

The inductivity, L, of a loop antenna, however, increases approximately with $W_1^2$, so that the voltage required to drive a current $J_1$ through the coil 251 ($U_1 = J_1 \cdot 2\pi f \cdot L_1$) becomes very high for large $W_1$. It is therefore, desirable to keep the turns $W_1$ of the antenna 251, $W_1$, low. This can be also understood from the basic transformer equation:

$$U_2/U_1 \, \alpha \, W_2/W_1 \tag{5}$$

The inductivity of a circular loop antenna of one winding (FIG. 9) is in a good approximation $$L \approx \mu_0 \, r_1 \, \ln r_1/r_0 \tag{6}$$

For $r_1 = 50$ cm and $r_0 = 1$ cm, we obtain $$L = 4\pi \cdot 10^{-9} \cdot 50 \cdot \ln 50 = 2.46 \, \mu H$$

From equation (4) it follows that for a voltage of 10V in the antenna or coil 271, a current of ~10A is required in the antenna or coil 251 at a frequency of 1 MHz.

The voltage required to drive a current of 10A through the antenna 251 is then $$U_1 = 2\pi f L \cdot J_1 \doteq 155V$$

which yields a required power to produce the field of:

$$P = 1/2 \, U \cdot J \doteq 780 \, VA$$

The following computation of the voltage induced in the antenna 31 on the label 25 is made with reference to FIG. 10 in which the antenna 31 is shown as a coil 281 in cross section with turns 283. These are $W_2$ turns.

The inductivity of the receiver coil is approximately $$L_2^{[nH]} \doteq 100 \cdot \pi \, W_2^2 \cdot r_2^2/6 \, r_2 + 9 \, l + 10b \tag{7}$$

(See FIG. 10) With $a \cong d = 0.4$ cm and $l = b = 0.4$ cm we obtain $$L_2^{[nH]} = 100\pi \cdot 10^4 \cdot 2^2/6 \cdot 2 + 9 \cdot 0.4 + 10 \cdot 0.4 = 4 \, \pi \cdot 10^6/12 + 3.6 + 4$$

$$L_2 = 630 \, \mu H$$

$$R_2 = 8\pi \, (r_2 + l/2) \cdot W/k \cdot d^2 \cdot \pi = 8 \cdot 2.2 \cdot 100/57 \cdot 16 = 1760/912 = 1.93\Omega$$

$$R_2 = 1.93\Omega$$

$$J_2 = U_2/\sqrt{R_2^2 + \omega^2 \, L_2^2} \, \omega L_2 = 2\pi \cdot 10^6 \cdot 630 \cdot 10^{-6} = 3950\Omega$$

$$J_2 \doteq 8.96/3950 \approx 2.3 \, mA$$

The power absorption with a matched external load (ohmic) of $R_2' = 4000\Omega$ is $$P_2 \doteq 1/2 \, (J_2)^2/2 \cdot R_2' = 2.6 \, mW$$

The relative change in the transmitter current is $$\Delta J/J = 1/2 \, \Delta P/P = 1/2 \, 2.6 \cdot 10^{-3}/780$$

and $$\Delta J = 16.6 \, \mu A \, (J = 10A)$$

While embodiments of this invention have been disclosed herein, many modifications of the embodiments and of their uses are feasible. This invention then is not to be restricted except insofar as is necessitated by the spirit of the prior art.

What is claimed is:

1. A label, to be subjected to an electromagnetic field while attached to an object in said field, for identifying said object, the said label including a substrate having printed thereon antenna means to be electromagnetically coupled to said electromagnetic field to absorb energy therefrom, said substrate also having printed thereon counter means, including a plurality of counters and also printed thereon, means for selectively connecting certain of said counters to said antenna means to produce a predetermined number of field-energy absorbing counts.

2. The label of claim 1 wherein the counter means includes a succession of counting components, conduction of each component being controllable, and each component being, in the absence of energy absorption from the field by the antenna means, non-conducting, the label also including means, connecting a first of said components to said antenna means, to be rendered conducting on receipt of a signal by said component from said antenna means, means connecting the other components in said succession each to a preceding component so as to be rendered conducting, only, both, on the conduction of the just preceding component and on said absorption of energy by said antenna means, and selective means for interrupting the flow of the signal from the antenna to any one of the succession of components thereby to permit connection in succession only of the components preceding said one component.

3. The label of claim 1 wherein the counter means includes a first counter including a plurality of counting components connected in a first succession, the antenna means being connected to energize a first of said components in said succession, an absorption of energy from the field, each succeeding component in said succession being connected to be energized only, both, while said antenna is absorbing energy from the field and when the just preceding component is energized, each component including timing means for timing the occurrence of energization of each succeeding component so that it occurs a predetermined first time interval after the energization of the just preceding component, the said label also including a second counter including a plurality of counting components, said last-named components being connected in a second succession with each of the components of the first counter and being, on absorption of energy from the field, connected in controllable energizing relationship with the components in said second succession and each component in said second succession being connected to energize the just succeeding component in said second succession only while
   a. a component of said first succession is in energizing relationship with the last-named just succeeding component of said second succession, and
   b. the just preceding component in said second succession is energized, each component in said second succession including timing means timing the occurrence of energization of each succeeding component so that energization of said last-named succeeding component occurs a predetermined second time interval substantially shorter than said first interval.

4. The label of claim 3 including connections between each of the components of the first succession and the components of the second succession for selectively setting the number of successive components of said second succession to be energized for each energization of each component of the first succession.

5. The label of claim 3 including means preventing back flow of current from each component of the second succession to other components of said succession and to the components of the first succession.

6. An object-identifying label to be subjected to an electromagnetic field, the said label including a substrate having printed thereon a circuit requiring a power supply external of said circuit and being capable of being powered by energy absorbed from said field, said circuit including antenna means to be electromagnetically coupled to said field to absorb energy therefrom, said circuit also including a plurality of counters and means for selectively connecting certain of said counters to said antenna means to produce a predetermined number of field energy absorbing counts in absorption of energy by said antenna means.

7. An object-identifying label to be subjected to an electromagnetic field the said label including a substrate having printed thereon a circuit devoid of any internal power supply but being capable of being powered by energy absorbed from said field, said circuit including:
   a. antenna means to be electromagnetically coupled to said field to absorb energy therefrom,
   b. a plurality of components each capable of passing abruptly from an OFF to an ON condition, and
   c. means connecting certain selected of said components to said antenna means in a sequential network such that when energized by energy absorbed from said field by said antenna means they pass from OFF to ON to OFF in sequence producing a sequence of counts.

8. The label of claim 7 wherein the plurality of components include a first set of components and a second set of components, and the connecting means includes means, connecting the components of said first set to said antenna means in a sequential network wherein in the absorption of energy by said antenna means said components of said first set, beginning with a first component, are turned ON in succession, each for a first predetermined time interval, and thereafter turned OFF, each succeeding last-named component being turned ON as the just preceding last-named component is turned OFF as shown in FIG. 6A hereof, and the connecting means also includes means connecting the components of the second set in a sequential network and means selectively connecting each of the components of the first set to the last-named sequential network so that in the turning ON of each component of the first set, a preselected number of components of the second set, beginning with a first component of the second set, are turned ON and, after a second predetermined time interval, turned OFF in succession, each succeeding last-named component being turned ON as the just preceding last-named component is being turned OFF as shown in FIG. 6B hereof.

9. The label of claim 8 wherein the first time interval is substantially longer than the second time interval so that a substantial number of second intervals can occur during a first interval.

* * * * *